US011423659B2

(12) United States Patent
Zhu et al.

(10) Patent No.: US 11,423,659 B2
(45) Date of Patent: Aug. 23, 2022

(54) METHOD, APPARATUS, ELECTRONIC DEVICE, AND STORAGE MEDIUM FOR MONITORING AN IMAGE ACQUISITION DEVICE

(71) Applicant: APOLLO INTELLIGENT CONNECTIVITY (BEIJING) TECHNOLOGY CO., LTD., Beijing (CN)

(72) Inventors: Xiaoxing Zhu, Beijing (CN); Fan Yang, Beijing (CN); Chengfa Wang, Beijing (CN); Yongyi Sun, Beijing (CN)

(73) Assignee: APOLLO INTELLIGENT CONNECTIVITY (BEIJING) TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/142,011

(22) Filed: Jan. 5, 2021

(65) Prior Publication Data
US 2021/0357660 A1 Nov. 18, 2021

(30) Foreign Application Priority Data
May 15, 2020 (CN) .......................... 202010413763.4

(51) Int. Cl.
*G06V 20/54* (2022.01)
*G06V 10/22* (2022.01)
(Continued)

(52) U.S. Cl.
CPC .............. *G06V 20/54* (2022.01); *G06V 10/22* (2022.01); *G06V 20/46* (2022.01); *G06V 20/48* (2022.01); *G06V 20/588* (2022.01)

(58) Field of Classification Search
CPC .... G06V 20/588; G06V 10/22; G06V 10/245; G06V 20/48; G06V 20/52; G06V 20/54;
(Continued)

(56) References Cited

U.S. PATENT DOCUMENTS

2013/0100286 A1* 4/2013 Lao .................. G06V 20/54
348/148
2016/0110623 A1 4/2016 Kim et al.

FOREIGN PATENT DOCUMENTS

CN 109871752 A 6/2019
CN 110798681 A 2/2020

OTHER PUBLICATIONS

Song Dynamic Calibration of Pan-Tilt-Zoom Cameras for Traffic Monitoring 2006 (Year: 2006).*
(Continued)

*Primary Examiner* — Nizar N Sivji
(74) *Attorney, Agent, or Firm* — Faegre Drinker Biddle & Reath LLP (57) ABSTRACT

A method, an apparatus, an electronic device, and a storage medium for monitoring an image acquisition device are provided, which are related to a field of computer vision technology. The method for monitoring the image acquisition device includes: determining a stop position of each target vehicle from a first video image acquired by the image acquisition device; determining a marking line in the first video image according to the stop positions of their respective target vehicles, and determining a deviation amount of the marking line in the first video image from a reference making line, and determining that the image acquisition device has deviated in a case that the deviation amount reaches a predetermined condition. The workload of manual
(Continued)

detection is reduced, and the accuracy of deviation amount monitoring is increased by comparing the marking line with the reference marking line.

12 Claims, 6 Drawing Sheets

(51) Int. Cl.
    *G06V 20/40*     (2022.01)
    *G06V 20/56*     (2022.01)

(58) Field of Classification Search
CPC .... G06V 20/58; G06V 20/582; G06V 20/584; G06V 20/46; G08G 1/166; G08G 1/096791; G08G 1/096783; G08G 1/16; H04N 17/002; G06T 2207/10016; G06T 2207/30232; G06T 2207/30236; G06T 7/80

See application file for complete search history.

(56) References Cited

OTHER PUBLICATIONS

Two-Dimensional Vehicle Tracking using Video Image Processing (Year: 1992).*
Video Partitioning and Video Segmentation in Content-Based Video Databases—2001 (Year: 2001).*
Fast and Precise Localization at Stop Intersections—2013 (Year: 2013).*
Real-time Highway Traffic Information Extraction Based on Airborne Video—2009 (Year: 2009).*
Extended European Search Report, European Patent Office, Application No. 20217743.2, dated Jun. 22, 2021, 10 pages.
Zheng Yuan et al., "A Practical Roadside Camera Calibration Method Based on Least Squares Optimization," IEEE Transactions on Intelligent Transportation Systems, vol. 15, No. 2, Apr. 2014, 13 pages.
Neeraj K. Kanhere et al., "A Taxonomy and Analysis of Camera Calibration Methods for Traffic Monitoring Applications," IEEE Transactions on Intelligent Transportation Systems, vol. 11, No. 2., Jun. 2010, 12 pages.
Rong Dong et al., "An Automatic Calibration Method for PTZ Camera in Expressway Monitoring System," 2009 World Congress on Computer Science and Information Engineering, Mar. 2009, 5 pages.
George S. K. Fung et al., "Camera Calibration from Road Lane Markings," 2003 Society of Photo-Optical nstrumentation Engineers, Oct. 2003, 11 pages.
Kai-Tai Song et al., "Dynamic Calibration of Pan-Tilt-Zoom Cameras for Traffic Monitoring," IEEE Transactions on Systems, Man, and Cybernetics—Part B: Cybernetics, vol. 36, No. 5, Oct. 2006, 13 pages.

* cited by examiner

METHOD, APPARATUS, ELECTRONIC DEVICE, AND STORAGE MEDIUM FOR MONITORING AN IMAGE ACQUISITION DEVICE

CROSS-REFERENCE TO RELATED APPLICATION

This application claims priority to Chinese patent application No. 202010413763.4, filed on May 15, 2020, which is hereby incorporated by reference in is entirety.

TECHNICAL FIELD

The present application relates to a field of computer vision technology, and in particular, to a method, apparatus, electronic device, and storage medium for monitoring an image acquisition device.

BACKGROUND

In the scene of video monitoring, the position and angular orientation of an image acquisition device are determined by measuring in advance, so that the video images acquired by the image acquisition device are in a good monitoring field of view.

In a case that the position or angular orientation of the image acquisition device is deviated by accident such as due to an external force, the monitoring may be affected.

SUMMARY

The embodiments of the present application provide a method, apparatus, electronic device and storage medium for monitoring an image acquisition device to solve one or more technical problems in the prior art.

In a first aspect, the present application provides a method for monitoring an image acquisition device, comprising:

determining a stop position of each target vehicle from a first video image acquired by the image acquisition device;

determining a marking line in the first video image according to the stop positions of their respective target vehicles; and determining a deviation amount of the marking line in the first video image from a reference marking line, and determining that the image acquisition device has deviated in a case that the deviation amount reaches a predetermined condition.

Based on the above, the deviation amount of the marking line in the first video image from the reference marking fine is calculated, and the deviation of the image acquisition device is determined according to the calculated result.

In one implementation, the target vehicle is determined by:

identifying each vehicle existed in each static image of the first video image to obtain a travelling trajectory of each vehicle;

determining the vehicle that has experienced stopping during travelling, as a first vehicle, according to the travelling trajectory of each vehicle;

determining the first vehicle without any other vehicle ahead within a predetermined range, as the target vehicle.

In one implementation, the determining the vehicle that has experienced stopping during travelling, as the first vehicle, comprises:

obtaining a positional variation amount of each vehicle in each static image; and determining the vehicle with the positional variation amount lower than a threshold, as the first vehicle.

In one implementation, the determining the marking line in the first video image according to the stop positions of their respective target vehicles comprises;

performing a statistical analysis on coordinates of the stop positions of their respective target vehicles;

determining the marking line in the first video image according to a result of the statistical analysis.

In one implementation, the method further comprises;

adjusting the reference marking line according to the marking line in the first video image, in a case that the deviation amount does not reach the predetermined condition.

In a second aspect, the present application provides an apparatus for monitoring an image acquisition device, comprising:

a stop position determination module, configured to determine a stop position of each target vehicle front a first video image acquired by the image acquisition device;

a marking line determination module, configured to determine a marking line nit the first video image according to the stop positions of their respective target vehicles; and a deviation determination module, configured to determine a deviation amount of the marking line in the first video image from a reference marking line, and determine that the image acquisition device has deviated in a case that the deviation amount reaches a predetermined condition.

In one implementation, the stop position determination module comprises:

a travelling trajectory determination sub-module, configured to identify each vehicle existed in each static image of the first video image to obtain a travelling trajectory of each vehicle:

a first vehicle determination sub-module, configured to determine the vehicle that has experienced stopping during travelling, as a first vehicle, according to the travelling trajectory of each vehicle;

a target vehicle determination sub-module, configured to determine the first vehicle without any other vehicle ahead within a predetermined range, as the target vehicle.

In one implementation, the first vehicle determination sub-module is further configured to:

obtain a positional variation amount of each vehicle in each static image, and determine the vehicle with the positional variation amount lower than a threshold, as the first vehicle.

In one implementation, the marking line determination module comprises:

a coordinate statistical analysis sub-module, configured to perform a statistical analysis coordinates of the stop positions of their respective target vehicles; and a marking line determination performance sub-module, configured to determine the marking line in the first video image according to a result of the statistical analysis.

In one implementation, the apparatus further comprises:

a reference marking line adjustment module, configured to adjust the reference marking line according to the marking line in the first video image, in a case that the deviation amount does not reach the predetermined condition.

In a third aspect, an embodiment of the present application provides an electronic device, comprising:

at least one processor; and a memory in communication connection with the at least one processor, wherein, the memory has instructions executable by the at least one processor stored therein, the instructions, when executed by the at least one processor, enable the at least one processor perform the method according to any one embodiment of the present application.

In a fourth aspect, an embodiment of the present application provides a non-transitory computer-readable storage medium having computer instructions stored therein, wherein the computer instructions, when executed by a computer, cause the computer to perform, the method according to any one embodiment of the present application.

Other effects of the above alternatives will be described below in combination with specific embodiments.

BRIEF DESCRIPTION OF THE DRAWINGS

The accompanying drawings are provided for to better understanding of the present disclosure, and do not constitute a limitation to the present application, wherein.

DETAILED DESCRIPTION

The exemplary embodiments of the application will be described below in combination with drawings, including various details of the embodiments of the application to facilitate understanding, which should be considered as exemplary only. Therefore, those of ordinary skill in the art should realize that various changes and modifications can be made to the embodiments described herein without departing from the scope and spirit of the present application. Likewise descriptions of well-known functions and structures are omitted in the following description toe clarity and conciseness.

Figure 1:
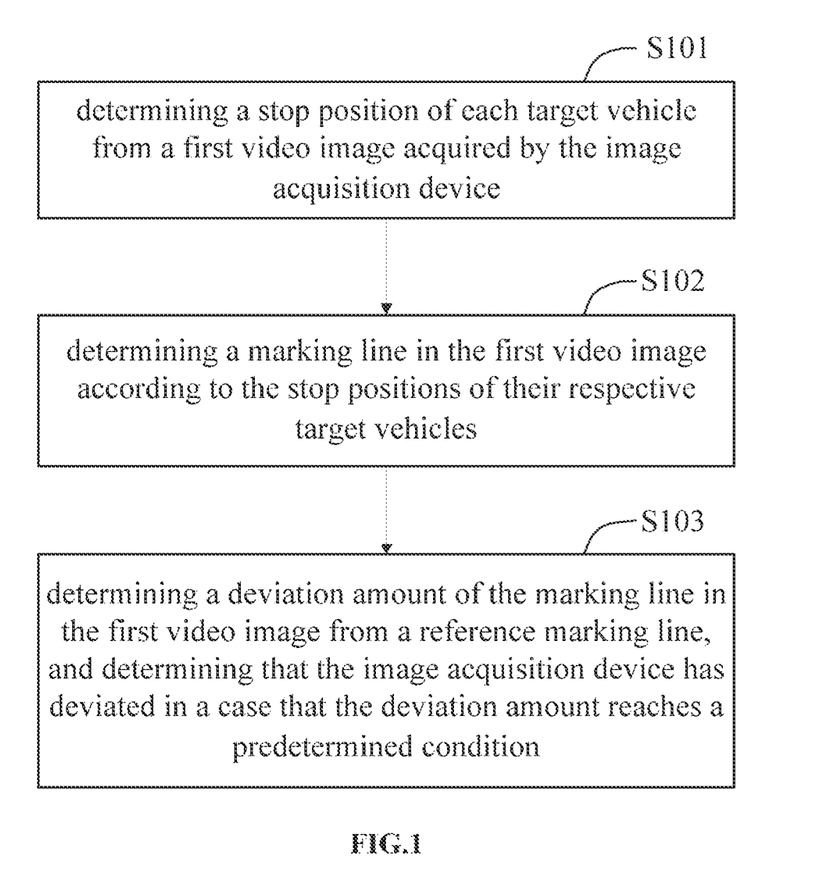
FIG. 1 shows a flowchart of the method for monitoring an image acquisition device according to the present application.

As shown in FIG. 1, in one implementation, a method for monitoring an image acquisition device is provided, which may include the following steps:

S101: determining a stop position of each target vehicle from a first video image acquired by the image acquisition device.

S102: determining a marking line in the first video image according to the stop positions of their respective target vehicles.

S103: determining a deviation amount of the marking line in the first video image from a reference marking line, and determining that the image acquisition device has deviated in a case that the deviation amount reaches a predetermined condition.

In the present application, the above steps may be implemented by a data processing device such as a server, or a cloud processor and the like. The data processing device may receive the information uploaded by all image acquisition devices arranged in the target area. According to the analysis of the uploaded information, the deviation a each image acquisition device may be detected.

The first video image may include multiple consecutive static images, for example, multiple consecutive static images within one hour, within one day and the like. It should be understood that the static images may also be of multiple non-consecutive ones.

All vehicles in each static image of the first video image are identified so as to determine the target vehicle. The way of identifying may include one or more of license plate number identification, vehicle body color identification, vehicle body pattern identification, or vehicle type identification and the like.

By identifying the vehicles, Identity Documents (IDs) may be assigned to different vehicles to distinguish them from each other. Among the identified vehicles, the vehicle for determining the marking line is selected, being referred to as the target vehicle in this embodiment. The selection process may include: determining the vehicle that his experienced stopping during travelling according to the travelling trajectory of each vehicle. Further, among the vehicles that have experienced stopping during travelling, the vehicle that stops at the first row, i.e. the vehicle without any other vehicle ahead, is selected as the target vehicle.

Generally, as for the target vehicle that stops at the first row at the intersection due to the red light, its head would be onto the stop line. In view of this, a stop line may be obtained from the first video image, according to the stop positions of a predetermined number of respective target vehicles. The stop line may be taken as the marking line in the first video image.

Further, with the travelling trajectory of each vehicle obtained, lane lines may be generated according to the traveling trajectory. For example, the width of a lane may be measured in a video image sample in advance. The travelling trajectory may be expanded according to the width of the lane in the video image, obtaining the lane according to the traveling trajectory. Lane lines may then be marked at both sides of the lane respectively, being taken as the marking lines in the first video image.

The marking line in the first video image is compared with the reference marking line, so as to determine whether the deviation amount of the marking line in the first video image reaches a predetermined condition. The predetermined condition may be that the coincidence degree of the marking line with the reference marking line is lower than a threshold, or that the slope difference between the marking line and the reference marking line is greater than a threshold, and the like. In a case that the predetermined condition is reached, it may be determined that the image acquisition device has deviated. Here, the deviation includes but is not limited to the changes of position and/or angle.

Here, the reference marking line may be determined in the same way as the marking wine in the first video image is determined. For example, on the first day or in the first month upon the image acquisition device is installed, multiple static images during the corresponding tune period may be identified, taking the identified marking line as the reference marking line.

Otherwise, after the image acquisition device has been installed, the marking line in the video image may also be identified by a pre-trained marking line identification model, taking the identified result as the reference marking line.

Or, manual marking may also be used. For example, after the image acquisition device has been installed, the stop line in the video image acquired by the image acquisition device may be marked by staff, taking the marked result as the reference marking line.

To increase the accuracy of the determination, in a case that the deviation amount of the marking line in the first video image from the reference marking line reaches the predetermined condition, the same way to determine the marking line in the first video image may be used to determine the marking lines in the second video image, the third video image and the like.

The marking lines in the second video image, the third video image and the like are compared with the reference marking line respectively. It may be determined that the image acquisition device has deviated, in a case that the results of multiple comparisons show that the deviation amount of the marking line in the from the reference marking line reaches the predetermined condition.

Based on the above, the marking line in the first video image is compared with the reference marking line, and the deviation of the image acquisition device is determined according to the result of the comparison. Thereby, the workload of manual detection is reduced, and the accuracy of deviation amount monitoring is increased by setting the reference marking line.

Figure 2:
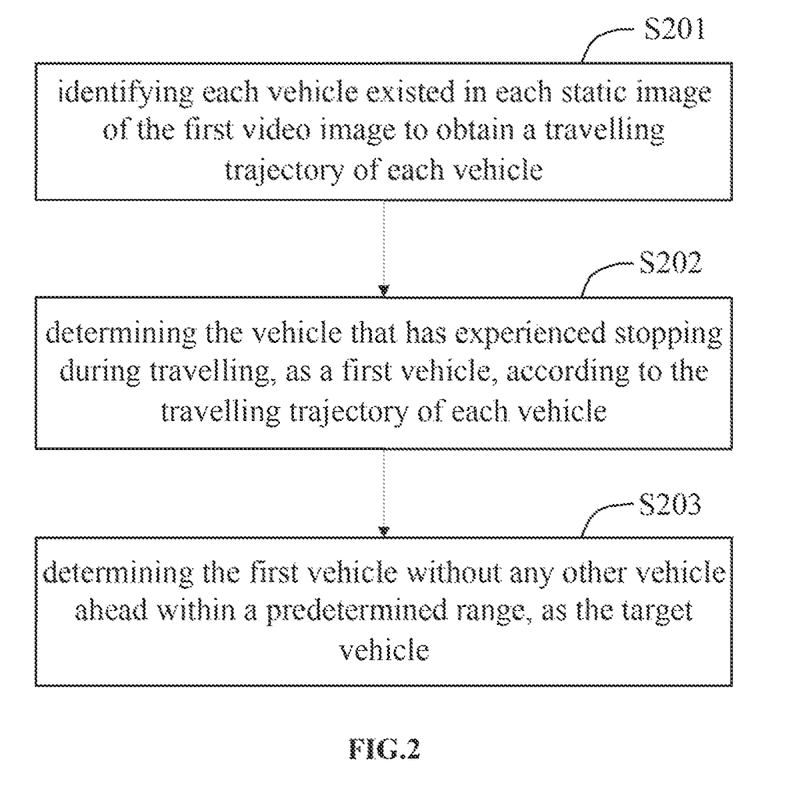
FIG. 2 shows a flowchart of determining the target vehicle according to the present application.

As shown in FIG. 2, in one implementation, determining the target vehicle includes:

S201: identifying each vehicle existed in each static image of the first video image to obtain a travelling trajectory of each vehicle.

S202: determining the vehicle that has experienced stopping during travelling, as a first vehicle, according to the travelling trajectory of each vehicle.

S203: determining the first vehicle without any other vehicle ahead within a predetermined range, as the target vehicle.

As to the identified first vehicle, its travelling trajectory may be obtained according to its position in each static image of the first video image. For example, with the vehicle identified as $ID_1$ detected for the first tune in the Nth static image, the positions of the vehicle identified as $ID_1$ may be determined respectively in other static images after the Nth static image that contain the vehicle identified as $ID_1$. Each position may be abstracted as a pixel point or a pixel block and may be fitted to obtain the travelling trajectory of the vehicle identified as $ID_1$.

According to the travelling trajectory, it may be determined whether the vehicle identified as $ID_1$ has experienced stopping during travelling. The vehicle identified as $ID_1$ may be determined as the first vehicle, i.e., the first vehicle identified as $ID_1$, in a case that it has experienced stopping.

Further, it is also required to determine whether there is any other vehicle ahead of the first vehicle identified as $ID_1$ when it stops. In the case of no any other vehicle ahead, the first vehicle identified as $ID_1$ may be determined as the target vehicle. For example, a range threshold or a distance threshold may be set. It is detected whether there is any other vehicle ahead of the first vehicle identified as $ID_1$ within the range threshold or the distance threshold. If not, it may be determined that there is no any other vehicle ahead of the first vehicle identified as $ID_1$ when it stops.

Generally, if the red light is on, vehicles would stop during travelling. Through the above determination, the vehicle that stops at the first row at the intersection may be selected. According to the stop positions of the selected target vehicles, the position of the stop line may be determined in the following steps, i.e., the position of the marking line may be determined.

Based on the above, the target vehicle for determining the marking line may be determined automatically with the vehicle identification and tracking technology.

In one implementation, determining the vehicle that has experienced stopping during travelling comprises:

obtaining a positional variation amount of each vehicle in each static image and determining the vehicle with the positional variation amount lower than a threshold, as the first vehicle.

Still, take the vehicle identified as $ID_1$ for example. With the vehicle identified as $ID_1$ detected for the first time in the Nth static image, a traversal is performed on each static image from the (N+1)th static image, so as to select all static images that contain the vehicle identified as $ID_1$.

The position of the vehicle identified as $ID_1$ may be determined in each selected static image. It may be determined that the vehicle identified as $ID_1$ has experienced stopping during travelling, in a case that the positional variation amount of the vehicle identified as $ID_1$ among a predetermined number of static images is lower than a threshold. The predetermined number may be 30, 50 and the like.

The positional variation amount of the vehicle identified as $ID_1$ among the predetermined number of static images may be determined directly from the static images. For example, in a static image, the identified result of the vehicle identified as $ID_1$ may be a bounding box in which the identification of the vehicle is marked. The central point of the bounding box may be taken as the position of the vehicle identified as $ID_1$. According to the coordinates of the central point of the bounding box for the vehicle identified as $ID_1$ in each static image, the positional variation amount of the vehicle identified as $ID_1$ may be obtained.

In addition, the position of the vehicle identified as $ID_1$ static image can also be converted into world coordinates, so as to determine the positional variation amount of the vehicle identified as $ID_1$.

Based on the above, the vehicle that has experienced stopping during travelling may be selected accurately.

Figure 3:
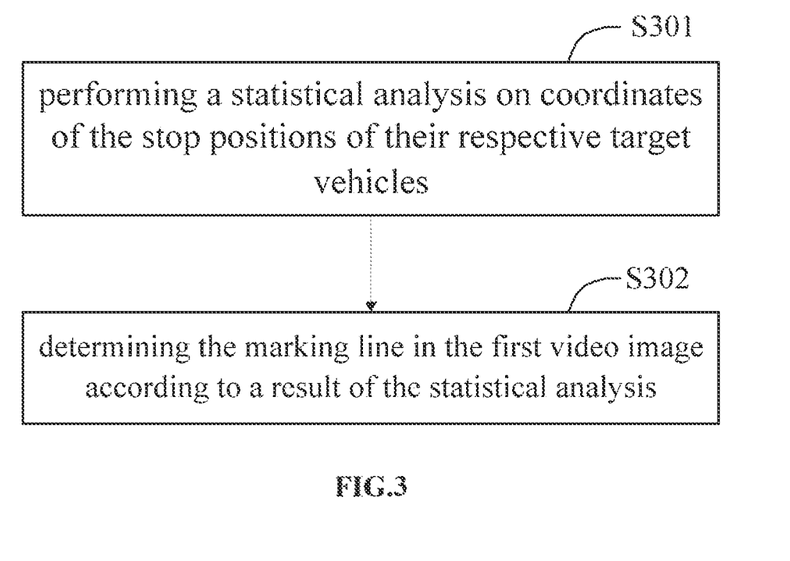
FIG. 3 shows a flowchart of determining the marking line in the first video image according to the present application.

As shown in FIG. 3, in one implementation, determining the marking line in the first video image according to the stop positions of their respective target vehicles comprises:

S301: performing a statistical analysis on coordinates of the stop positions of then respective target vehicles.

S302: determining the marking line in the first video image according to a result of the statistical analysis.

In an image, the identified result of each target vehicle may be a bounding box. The front and back of the bounding box may be determined according to the travelling direction of the target vehicle. The from of the bounding box may be referred to as the head position of the corresponding target vehicle, and the head position may be taken as the stop position.

Take the case where the target vehicle enters into the first video image at its upper edge and exits therefrom at its lower edge as an example. Because various target vehicles stop at the intersection side by side, the ordinates of the stop positions of their respective target vehicles in the first video image have little difference from each other. In view of this, the statistical analysis may be performed on the average value of the ordinates of the stop positions of their respective target vehicles in the first video image. The ordinate may be the coordinate in the static image, for example, taking the pixel point at the lower left corner of each static image as the coordinate origin. A horizontal line segment may be obtained in the video image according to the average value of the ordinates. This horizontal line may be taken as the marking line, i.e., the stop line.

Based on the above, the position of the stop line at an intersection may be determined according to the stop positions of a predetermined number of respective target vehicles. The marking line in an image may be identified automatically by taking the stop line in the image as the marking line.

In one implementation, the method further comprises:

adjusting the reference marking line according to the marking line in the first video image, in a case that the deviation amount does not reach the predetermined condition.

In a case that the deviation amount of the marking line in the first video image from the reference marking line does not reach the predetermined condition, it may be determined that the image acquisition device has not deviated. In view of this, both the reference marking line and the marking line in the first video image may be taken as marking line samples. A statistical analysis may be performed on various marking line samples and the reference marking line may be replaced with the result of the statistical analysis, so as to adjust the reference marking line. For example, in a case that the marking line is represented by pixel points, the statistical analysis run be performed on the intersection pixel points, or the union pixel points, etc. of various marking lines. Or, the statistical analysis may be performed on the middle marking line of various marking lines.

Based on the above, with sufficient marking line samples, the adjusted reference marking line may be close to the marking line in the real world.

Figure 4:
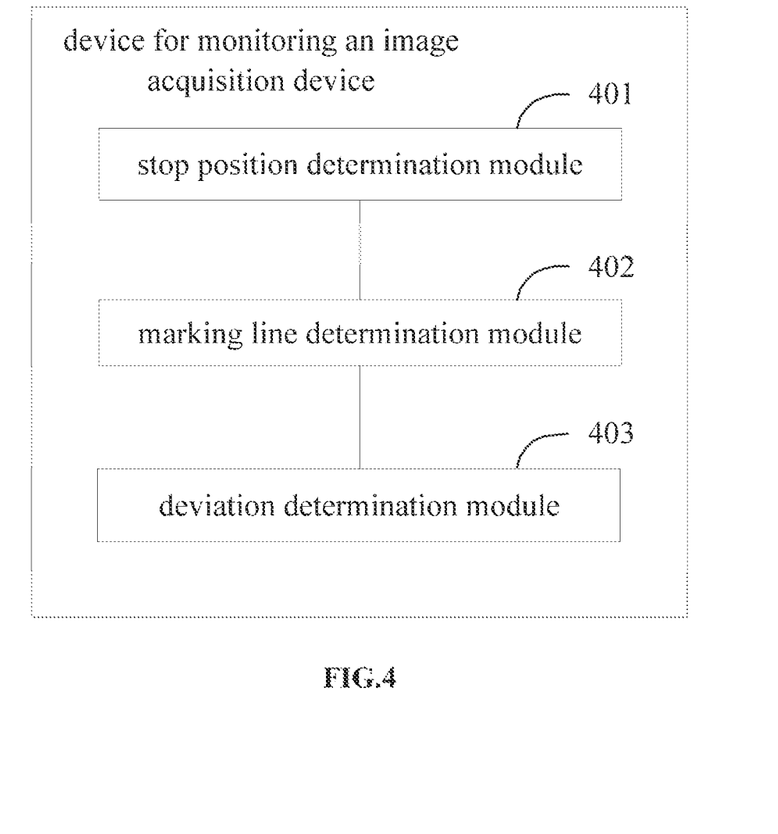
FIG. 4 shows a schematic diagram of the apparatus for monitoring an image acquisition device according to the present application.

As shown in FIG. 4, the present application provides apparatus for monitoring an image acquisition device, comprising:

a stop position determination module 401, configured to determine a stop position of each target vehicle from a first video image acquired by the image acquisition device;

a marking line determination module 402, configured to determine a marking line in the first video image according to the stop positions of their respective target vehicles; and a deviation determination module 403, configured to determine a deviation amount of the marking line in the first video image from a reference marking line, and determine that the image acquisition device has deviated in a case that the deviation amount reaches a predetermined condition.

Figure 5:
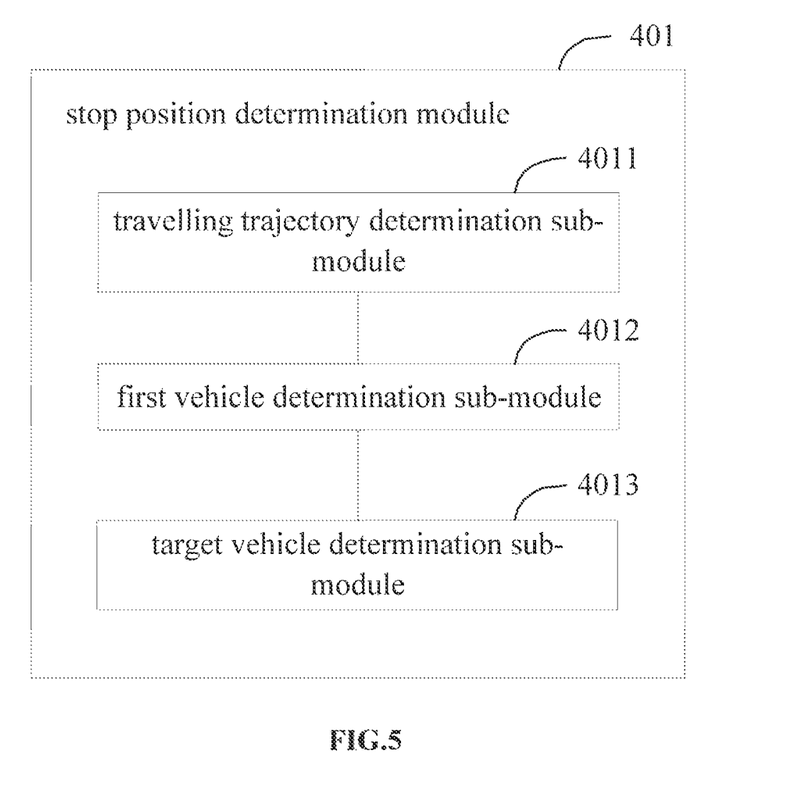
FIG. 5 shows a schematic diagram of the stop position determination module according to the present application.

As shown in FIG. 5, in one implementation, the stop position determination module 401 comprises:

a travelling trajectory determination sub-module 4011, can figured to identify each vehicle existed in each static image of the first video image to obtain a travelling trajectory of each vehicle, a first vehicle determination sub-module 4012, configured to determine the vehicle that has experienced stopping during travelling, as a first vehicle, according to the travelling trajectory of each vehicle; and a target vehicle determination sub-module 4013, configured to determine the first vehicle without any other vehicle ahead within a predetermined range, as the target vehicle.

In one implementation, the first vehicle determination sub mode 4012 is further configured to:

obtain a positional variation amount of each vehicle in each static image, and determine the vehicle with the positional variation amount lower than a threshold, as the first vehicle.

Figure 6:
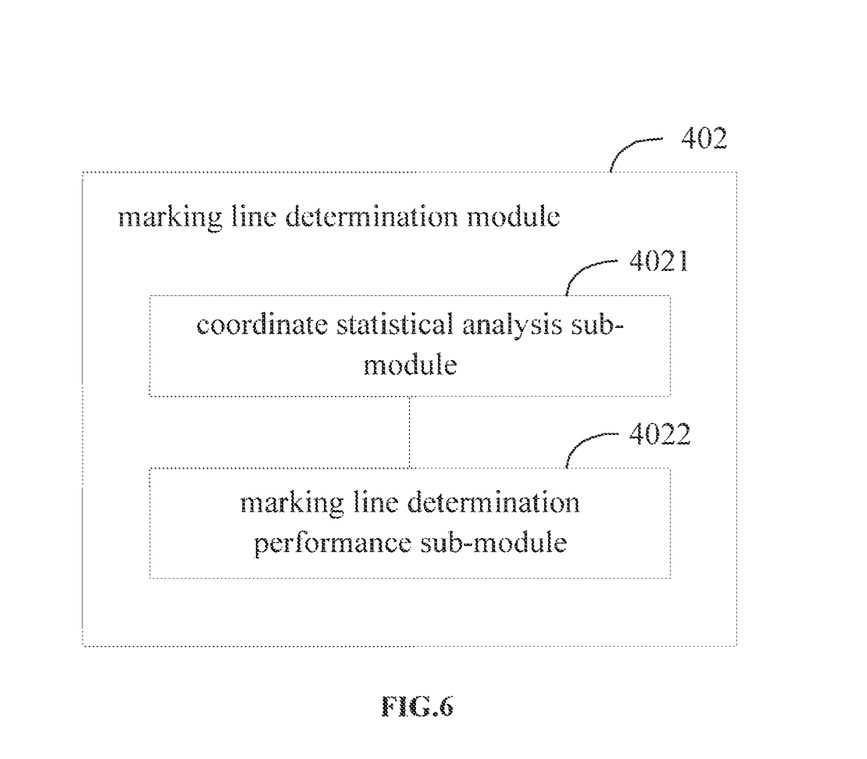
FIG. 6 shows a schematic diagram of the marking line determination module according to the present application.

As shown in FIG. 6, in one implementation, the marking line determination module 402 comprises:

a coordinate statistical analysis sub-module 4021, configured to perform a statistical analysis on coordinates of the stop positions of their respective target vehicles; and a marking line determination performance sub-module 4022, configured determine the marking line in die first video image according to a result of the statistical analysis.

In one implementation, the apparatus for monitoring the image acquisition device further comprises:

a reference marking line adjustment module, configured to adjust the reference marking line according to the marking line in the first video image, in a case that the deviation amount does not reach the predetermined condition.

The function of each module in each of the apparatuses according to embodiments of the present application may refer to corresponding descriptions in the above method, which will not be repeated here.

According to embodiments of the present application, an electronic device and a readable storage medium are also provided herein.

Figure 7:
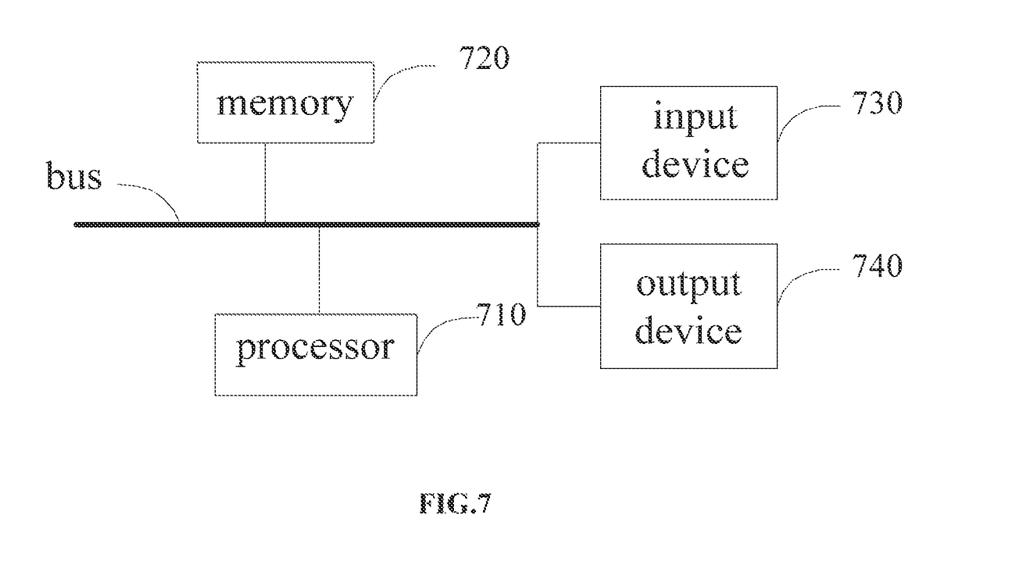
FIG. 7 shows a block diagram of an electronic device for implementing the method for monitoring an image acquisition device according to an embodiment of the present application.

As shown in FIG. 7, it is a block diagram of an electronic device for implementing the method for monitoring an image acquisition device according to an embodiment of the present application. The electronic device is intended to represent various forms of digital computers, such as laptop computers, desktop computers, workbenches, personal digital assistants, servers, blade servers, mainframe computers, and other suitable computers. The electronic device may also represent various forms of mobile devices, such as personal digital assistants, cellular phones, smart phones, wearable devices, and other similar computing devices. The components shown herein, their connections and relationships, and their functions are merely examples, and are not intended to limit the implementation of the present application described and/or claimed herein.

As shown in FIG. 7, the electronic device includes: one or more processors 710, a memory 720, and interfaces for connecting various components which include a high-speed interface and a low-speed interface. The various components are connected to each other using different buses and may be installed on a common motherboard or installed in other ways as needed. The processor may process instructions executed within the electronic device, including instructions which are stared in the memory or on the memory to display graphic information of a graphical user interface (GUI) on an external input/output device (such as a display apparatus coupled to the interface). In other embodiments, multiple processors and/or multiple buses may be used with multiple memories if desired. Similarly, multiple electronic devices may be connected, and each device provides a part of necessary operations (for example, as a serer array, a group of blade servers, or a multi-processor system). In FIG. 7, one processor 710 is taken as an example.

The memory 720 may be a non-transitory computer readable storage medium provided by the present application. Here, the memory stores instructions executable by at least one processor, so that the at least one processor performs the method for monitoring an image acquisition device provided by the present application. The non-transitory computer readable storage medium of the present application stores computer instructions, which are used to cause the computer to perform the method for monitoring an image acquisition device provided by the present application.

The memory 720, as a non-transitory computer readable storage, medium, may be used to store non-transitory software programs, non-transitory computer executable programs and modules, such as program instructions/modules (for example, the stop position determination module 401, the marking line determination module 402, and the deviation determination module 403 shown in FIG. 4) corresponding to the method for monitoring image acquisition device in embodiments of the present application. The processor 710 executes various functional applications and data processing of the server by executing the non-transitory software programs, instructions, and modules stored in the memory 720, that is, implements the method for monitoring an image acquisition device in foregoing method embodiments.

The memory 720 may include a storage program area and a storage data area, where the storage program area may store an operating system and application programs required by at least one function, and the storage data area may store the data created based on the use of the electronic device performing the method for monitoring an image acquisition device, and the like. In addition, the memory 720 may include a high-speed random-access memory, and may also include a non-transitory memory, such as at least one magnetic disk storage device, a flash memory device, or other non-transitory solid-state storage devices. In some embodiments, the memory 720 may optionally include memories set remotely relative to the processing 710, and these remote memories may be connected to the foresaid electronic device through a network. Instances of the above network include but are not limited to the Internet, an intranet, a local area network, a mobile communication network, and combinations thereof.

The foresaid electronic device may further include: an input device 730 and an output device 740. The processor 710, the memory 720, the input device 730 and the output device 740 may be connected through a bus or in other ways. In FIG. 7, the connection through a bus is taken as an example.

The input device 730, such as a touch screen, a keypad, a mouse, a trackpad, a touchpad, an indication rod, one or more mouse buttons, a trackball, a joystick, etc., may receive input numeric or character information, and generate key signal inputs related to user settings and function control of the foresaid electronic device. The output device 740 may include a display apparatus, an auxiliary lighting device (for example, LED), a tactile feedback device (for example, a vibration motor), and the like. The display apparatus may include, but is not limited to, a liquid crystal display (LCD), a light emitting diode (LED) display, and a plasma display. In some embodiments, the display apparatus may be a touch screen.

Various embodiments of the systems and techniques described herein may be implemented in digital electronic circuit systems, integrated circuit systems, application specific integrated circuits (ASICs), computer hardware, firmware, software, and/or combination thereof. These various embodiments may include: implementations in one or more computer programs which may be executed and/or interpreted on a programmable system that includes at least one programmable processor, which may be a dedicated or general-purpose programmable processor that may receive data and instructions from a storage system, at least one input device, and at least one output device, and transmit the data and instructions to the storage system, the at least one input device, and the at least one output device.

These computer programs (also called as programs, software software applications, or codes) include machine instructions of programmable processors, and these computer programs may be implemented using a high-level process and/or object-oriented programming language, and/ or an assembly/machine language. As used herein, the terms "machine readable medium" and "computer readable medium" refer to any computer program product, apparatus, and/or device (for example, a magnetic disk, an optical disk, a memory, a programmable logic device (PLD)) used to provide machine instructions and/or data to a programmable processor, including the machine-readable medium that receives machine instructions as machine readable signals. The term "machine readable signal" refers to any signal used to provide machine instructions and/or data to the programmable processor.

In order to provide interactions with a user, the system and technology described herein may be implemented an a computer which has: a display device (for example, CRT (Cathode Ray Tube) or LCD (liquid crystal display) monitor) for displaying information to the user; and a keyboard and pointing device (for example, a mouse or a trackball) through which the user may provide input to the computer. Other kinds of devices may also be used to provide interactions with a user for example, the feedback provided to a user may be any form of sensory feedback (for example, visual feedback, auditory feedback, or tactile feedback); and input from a user may be received using any form (including acoustic input, audio signal input, or tactile input).

The systems and techniques described herein may be implemented in a computing system (for example, as a data server) that includes back-end components, or a computing system (for example, an application server) that includes middleware components, or a computing system (for example, a user computer with a graphical user interface or a web browser through which the user may interact with the implementation of the systems and technologies described herein) that includes from end components, or a computing system that includes any combination of such back-end components, intermediate components, or front-end components. The components of the system may be interconnected by any form or medium of digital data communication (for example, a communication network). Examples of communication networks include: a Local Area Network (LAN), a Wide Area Network (WAN), and the Internet.

The computer system may include a client and a server. The client and the server are generally remote from each other and typically interact through a communication network. The client-server relationship is generated by computer programs that run on respective computers and have a client-server relationship with each other.

It should be understood that various forms of processes shown above may be used to reorder, add, or delete steps. For example, respective steps described in the present application may be executed in parallel, or may be executed sequentially, or may be executed in a different order, as long as the desired result of the technical solution disclosed in the present application can be achieved, no limitation is made herein.

The above specific embodiments do not constitute a limitation on the protection scope of the present application. It should be understood by those skilled in the art that various modifications, combinations, sub-combinations, and substitutions may be made according to design requirements and other factors. Any modification, equivalent replacement and improvement, and the like made within the spirit and principle of the present application shall be fall in the protection scope of the present application.

What is claimed is:

1. A method for monitoring an image acquisition device, comprising: determining a stop position of each target vehicle from a first video image acquired by the image acquisition device; determining a marking line in the first video image according to the stop positions of their respective target vehicles, wherein the marking line comprises a stop line; and determining a deviation amount of the marking line in the first video image from a reference marking line, and determining that the image acquisition device has deviated in a case that the deviation amount reaches a predetermined condition, wherein the target vehicle is determined by: identifying each vehicle existed in each static image of the first video image to obtain a travelling trajectory of each vehicle; determining the vehicle that has experienced stopping during travelling, as a first vehicle, according to the travelling trajectory of each vehicle; and determining the first vehicle without another vehicle ahead within a predetermined range, as the target vehicle.

2. The method according to claim 1, wherein the determining the vehicle that has experienced stopping during travelling, as the first vehicle, comprises:
obtaining a positional variation amount of each vehicle in each static image; and
determining the vehicle with the positional variation amount lower than a threshold, as the first vehicle.

3. The method according to claim 1, wherein the determining the marking line in the first video image according to the stop positions of their respective target vehicles comprises:
performing a statistical analysis on coordinates of the stop positions of their respective target vehicles; and
determining the marking line in the first video image according to a result of the statistical analysis.

4. The method according to claim 1, further comprising:
adjusting the reference marking line according to the marking line in the first video image, in a case that the deviation amount does not reach the predetermined condition.

5. An apparatus for monitoring an image acquisition device, comprising: a processor and a memory for storing one or more computer programs executable by the processor, wherein when executing at least one of the computer programs, the processor is configured to perform operations comprising: determining a stop position of each target vehicle from a first video image acquired by the image acquisition device; determining a marking line in the first video image according to the stop positions of their respective target vehicles, wherein the marking line comprises a stop line; and determining a deviation amount of the marking line in the first video image from a reference marking line, and determine that the image acquisition device has deviated in a case that the deviation amount reaches a predetermined condition, wherein the target vehicle is determined by: identifying each vehicle existed in each static image of the first video image to obtain a travelling trajectory of each vehicle; determining the vehicle that has experienced stopping during travelling, as a first vehicle, according to the travelling trajectory of each vehicle; and determining the first vehicle without another vehicle ahead within a predetermined range, as the target vehicle.

6. The apparatus according to claim 5, wherein the determining the vehicle that has experienced stopping during travelling, as the first vehicle, comprises:
obtaining a positional variation amount of each vehicle in each static image, and determining the vehicle with the positional variation amount lower than a threshold, as the first vehicle.

7. The apparatus according to claim 5, wherein the determining the marking line in the first video image according to the stop positions of their respective target vehicles comprises:
performing a statistical analysis on coordinates of the stop positions of their respective target vehicles; and
determining the marking line in the first video image according to a result of the statistical analysis.

8. The apparatus according to claim 5, wherein when executing at least one of the computer programs, the processor is further configured to perform operations comprising:
adjusting the reference marking line according to the marking line in the first video image, in a case that the deviation amount does not reach the predetermined condition.

9. A non-transitory computer-readable storage medium having computer instructions stored therein, wherein the computer instructions, when executed by a computer, cause the computer to perform operations comprising: determining a stop position of each target vehicle from a first video image acquired by the image acquisition device; determining a marking line in the first video image according to the stop positions of their respective target vehicles, wherein the marking line comprises a stop line; and determining a deviation amount of the marking line in the first video image from a reference marking line, and determining that the image acquisition device has deviated in a case that the deviation amount reaches a predetermined condition, the target vehicle is determined by: identifying each vehicle existed in each static image of the first video image to obtain a travelling trajectory of each vehicle; determining the vehicle that has experienced stopping during travelling, as a first vehicle, according to the travelling trajectory of each vehicle; and determining the first vehicle without another vehicle ahead within a predetermined range, as the target vehicle.

10. The non-transitory computer-readable storage medium according to claim 9, wherein the determining the vehicle that has experienced stopping during travelling, as the first vehicle, comprises:
obtaining a positional variation amount of each vehicle in each static image; and
determining the vehicle with the positional variation amount lower than a threshold, as the first vehicle.

11. The non-transitory computer-readable storage medium according to claim 9, wherein the determining the marking line in the first video image according to the stop positions of their respective target vehicles comprises:
performing a statistical analysis on coordinates of the stop positions of their respective target vehicles; and
determining the marking line in the first video image according to a result of the statistical analysis.

12. The non-transitory computer-readable storage medium according to claim 9, the computer instructions, when executed by a computer, cause the computer to further perform operations comprising:
adjusting the reference marking line according to the marking line in the first video image, in a case that the deviation amount does not reach the predetermined condition.

* * * * *